Figure 1:
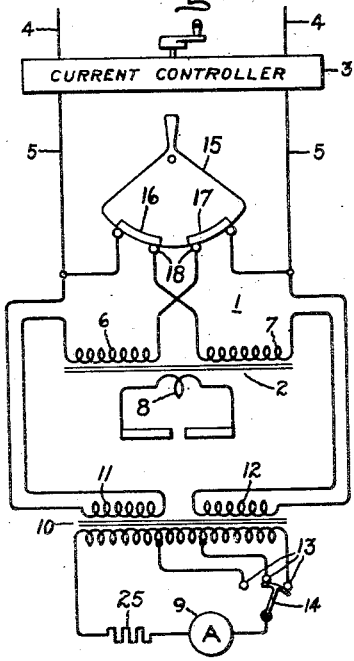

March 8, 1949.  W. A. SOLEY, JR  2,464,061
WELDING CURRENT TRANSFORMER CONNECTION
Filed April 3, 1946

Inventor:
William A. Soley Jr.,
by Ernest C. Britton
His Attorney.

Patented Mar. 8, 1949

2,464,061

UNITED STATES PATENT OFFICE 2,464,061

WELDING CURRENT TRANSFORMER CONNECTION

William A. Soley, Jr., Melrose, Mass., assignor to General Electric Company, a corporation of New York Application April 3, 1946, Serial No. 659,204

4 Claims. (Cl. 171—95)

This invention relates to transformer connections and more particularly to improvements in metering current transformer connections for wide current range circuits.

The readability of any given meter scale depends, among other things, on the size and spacing of its indicia. That is to say, the greater the size and spacing of the indicia, the greater the readability. Consequently, the range of any normal size scale having good readability is fairly limited. Wide range is usually obtained by changing the ratio of the actual quantity to be measured to the responsive energization of the meter, and at the same time effectively changing the value of the scale units in the same ratio. Thus, if a given value of a quantity to be measured causes full scale deflection and the ratio of energization is so changed that ten times that value of the quantity now produces full scale deflection, then all the scale units must be multiplied by ten to give a correct reading. Often the same meter includes a plurality of scales differing from each other by definite ratios.

In the measurement of large alternating currents a current transformer is usually interposed between the circuit whose current is to be measured and the ammeter so as to step the current down to a value suitable for the instrument. The ratio between the circuit current and the meter current is then usually changed by changing the ratio of the current transformer, ordinarily by changing taps on the secondary winding which, of course, is the one with the larger number of turns. However, accurate current transformation, especially with a heavy current transformer burden, can only be obtained over a limited range of current transformer ratios by changing secondary taps. This is because, as the secondary turns are decreased, a given rated secondary current will correspond to a smaller and smaller number of primary ampere-turns but because of the unavoidable primary exciting ampere-turns there is a definite lower limit to which the primary ampere-turns can drop and still give accurate current transformation. The practical ratio range is typically four to one.

For a given rated secondary current, corresponding, for example, to full scale meter deflection, the primary current, and hence the transformer heating will vary in proportion to the ratio. Usually the current transformer is designed for continuous operation or 100 per cent duty cycle at rated current for the lowest ratio (minimum secondary turns) and the rated duty cycle at rated current for the higher ratios is reduced. Thus, if the highest ratio is four times the lowest ratio, the rated duty cycle at rated current for the maximum ratio becomes typically 25 per cent.

Certain electric devices, however, operate over a very wide range of current. For example, some resistance welding machines have a welding current which can be varied over an eight to one ratio, say from 7,500 amperes to 60,000 amperes. The measurement of such a current range with good meter readability is therefore a not inconsiderable problem.

Resistance welding machines include, typically, a welding transformer and a current controller in the primary circuit of the welding transformer. The welding transformer usually has a one-turn secondary winding and often has a multi-section primary winding. By changing the connections between the sections of the primary winding from series to parallel (or to series-parallel if there are more than two sections) the welding current range for a given range of the current controller is greatly increased. Thus, for the same primary circuit or input current a change from parallel to series will double the secondary or welding current.

One proposal for solving the previously described problem has been to connect the primary winding of the current transformer in series with only one of the primary sections of the welding transformer when the sections are in parallel. In this way the current transformer current would not vary over as wide a range as the input current to the welding transformer. However, it was found that the currents in the parallel-connected primary sections of the welding transformer were considerably unbalanced so that correct indications were not given.

To overcome this difficulty I make the current transformer with two (or more) primary sections, each to be connected into a different branch of the welding transformer circuit so that the branch currents would be averaged, and by use of suitable ratios accurate indications of total welding current are given. In this way the current transformer does not have to carry the full line or input current of the welding transformer when its primary sections are parallel-connected. Furthermore, the connections will be such that correct indications are given regardless of whether the welding transformer primary sections are connected in series (or in series-parallel) instead of in parallel.

An object of the invention is to provide a new and improved transformer system.

Another object of the invention is to provide a new and improved metering current transformer connection for wide current range circuits.

A further object of the invention is to provide a new and improved system for measuring the current of multiple primary winding welding machines.

The invention will be better understood from the following description taken in connection with the accompanying drawing and its scope will be pointed out in the appended claims.

Figure 2:
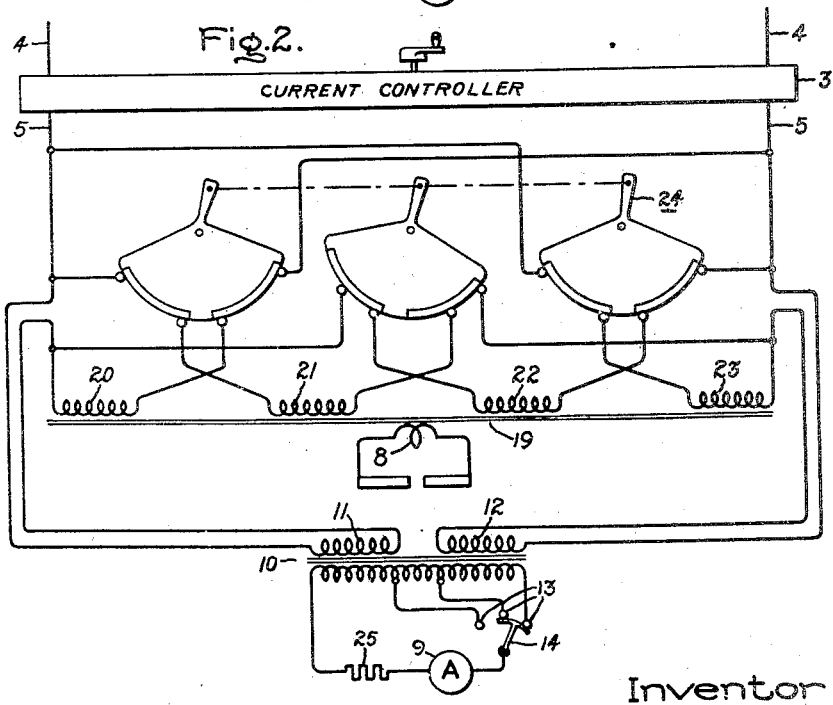

In the drawing Fig. 1 illustrates diagrammatically an embodiment of the invention in which the welding transformer has two primary winding sections, and Fig. 2 is a modification in which the welding transformer has four primary winding sections.

Referring now to the drawing, and more particularly to Fig. 1, there is illustrated diagrammatically a welding machine 1 which comprises a welding transformer 2 and a current controller which is indicated schematically at 3. The current controller may be of any suitable type, such, for example, as a well known electronic type controller for varying the input to the welding transformer. An input circuit 4 is connected from any suitable source of current supply, not shown, to the current controller, and another circuit 5 leads from the current controller to the primary winding of the welding transformer which is shown as consisting of two sections 6 and 7. The secondary winding of the welding transformer is shown at 8 and consists, typically, of a single turn of large cross section conductor which is suitable for carrying very heavy currents.

The welding current of the machine 1 is measured by means of a suitably calibrated ammeter 9 which is energized through a current transformer 10. The ammeter preferably has a conventional multiple scale (not shown). The current transformer 10 has primary winding sections 11 and 12 which are connected respectively in series with the sections 6 and 7 of the primary winding of the welding transformer. The ratio of the current transformer 10 is varied by means of taps 13 brought out from its secondary winding, and the ammeter is selectively connected to these taps by means of a tap changing switch 14 which is so constructed as to make contact with the next tap before it breaks contact with the first one so as not to open the secondary circuit at any time.

The inter-connection between the primary sections of both transformers is controlled by a suitable series-paralleling switch, an example of which is indicated at 15. This switch is shown in its paralleling position and it will be noted that the sections 6 and 11, while being in series with each other, are in parallel with another branch circuit comprising the sections 7 and 12 which are in series with each other. If, now, the controller is moved to the right or left so as to cause its bridging contact 16 or its bridging contact 17 to make a bridging connection between the two center fixed contacts 18, then all four primary sections 6, 7, 11 and 12 will be connected in series.

By means of the above described system the current in the primary sections 11 and 12 of the current transformer will be equal to the line or input current when the sections are series-connected and will be equal to the section currents or, roughly, one-half the line or input current when the sections are parallel-connected, so that the line or input current can be changed over a range at least twice as great as the range which an ordinary current transformer and meter combination can handle with good meter readability. Furthermore, it will be noted that operating the switch 15, to change the connections from series to parallel, or vice versa, will not change the calibration or setting of the meter and that the accuracy of the meter reading will not be affected. This can readily be understood by assuming that the current in the primary sections is the same under both series- and parallel-connected conditions. It will therefore follow that the secondary currents of the welding transformer and the current transformer will also be the same regardless of whether the connections are series or parallel because the ampere turns will be the same in each case so that the reading of the meter will not be affected. Of course, ordinarily, the section currents are not kept the same when the change is made from a series connection to a parallel connection, or vice versa, and therefore it is usually necessary to use another scale of the meter and to operate the tap changing switch 14.

The ammeter 9 is ordinarily calibrated to read directly the welding current which, of course, is the current in the secondary winding 8 of the welding transformer and which is proportional to the total current in all of the primary sections of the welding transformer.

Fig. 2 is generally similar to Fig. 1 except that a welding transformer 19 is provided which has four primary sections 20, 21, 22 and 23, and also a more elaborate three position series-parallel connection changer 24 is provided. In the illustrated position of this connection changer section 11 of the primary winding of the current transformer 10 is connected in series with both sections 20 and 22 of the primary winding of the welding transformer, and these two latter sections are in turn connected in parallel with each other. This series-parallel combination is in turn paralleled by a second series-parallel combination consisting of the primary section 12 of the current transformer which is in series with the primary sections 21 and 23 of the welding transformer, and these latter two sections are in turn in parallel with each other. When the handle of the connection changer 24 is moved to the left a short way the connections are broken to the left hand fixed contacts of the left and right hand units of the device and the left hand movable contacts of the left and right hand units make bridging connections between their two center fixed contacts. Also, the right hand movable contacts of the right and left hand units break the bridging connection which they previously made between their two right hand contacts. The connections of the middle unit remain the same. This causes section 20 and 21 to be connected in series with each other and in parallel with sections 22 and 23 which, in turn, are in series with each other. Sections 11 and 12 are connected in series with each other and in series with the series-parallel connected sections 20, 21, 22 and 23. When the control handle is moved further to the left until the left hand movable contact of the middle unit bridges the center fixed contacts it is in its series-connected position corresponding to the similar position of the controller 15 in Fig. 1, and all of the primary sections 11, 12, 20, 21, 22 and 23 are connected in series.

The operation of Fig. 2 is essentially the same as Fig. 1 and the change between series-parallel connections and series connections permits a doubling of the range of the line or input current in the circuit 4 without the necessity of having a doubly wide range of ratios of the current transformer 10.

The resistor 25 in series with the ammeter 9 in both figures represents another burden on the current transformer. For example, it may be the primary control element for automatically regulating the current controller 3 in any well known manner so as to hold the welding current at its adjusted value. Ordinarily it is about ten times the ammeter burden. Its presence therefore aggravates the problem which is solved by this invention.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a main transformer having a primary winding and a secondary winding, at least one of said windings have a plurality of sections, a current transformer having a primary winding and a secondary winding, at least one of the current transformer windings having a plurality of sections, the current transformer winding sections being connected respectively in series with different main transformer sections, and means for selectively connecting the serially-connected pairs of sections in series and in parallel.

2. In combination, a main transformer having a primary winding and a secondary winding, at least one of said windings having a plurality of sections, a current transformer having a primary winding and a secondary winding, at least one of the current transformer windings having a plurality of sections, said winding sections being arranged in groups, each group having at least one section from each transformer, the sections in each group being serially-connected, and means for selectively connecting said groups in series and in parallel.

3. In combination, a main transformer having a multi-section primary winding and a secondary winding, a controller for varying the input current of said main transformer between wide limits, a current transformer having a multi-section primary winding and a secondary winding, an ammeter, means for connecting said ammeter to said current transformer secondary winding, each section of the current transformer primary winding being connected in series with a different section of the main transformer primary winding so as to constitute a plurality of groups of said serially-connected sections, and means for selectively connecting said groups in parallel and in series.

4. In combination, a resistance welding transformer having a multi-section primary winding and a one-turn secondary winding, a controller for varying the input current of said welding transformer between wide limits, a current transformer having a multi-section primary winding and a multi-tapped secondary winding, a multi-scale ammeter calibrated to read welding current directly, switching means for selectively connecting said ammeter to said taps of said current transformer secondary winding, each section of the current transformer primary winding being connected in series with a different section of the welding transformer primary winding so as to constitute a plurality of groups of said serially-connected sections, and means for selectively connecting said groups in parallel and in series.

WILLIAM A. SOLEY, JR.

REFERENCES CITED

The following references are of record in the file of this patent:

UNITED STATES PATENTS

| Number | Name | Date |
|---|---|---|
| 1,896,397 | Gay | Feb. 7, 1933 |
| 2,179,333 | Horsley | Nov. 7, 1939 |
| 2,355,068 | Graves | Aug. 8, 1944 |